(12) United States Patent
Farrell et al.

(10) Patent No.: US 9,081,820 B2
(45) Date of Patent: **\*Jul. 14, 2015**

(54) FLEXIBLE CONNECTOR FRAMEWORK FOR DATA FEED GENERATION

(71) Applicant: International Business Machines Corporation, Armonk, NY (US)

(72) Inventors: Joel A. Farrell, Ashland, NY (US); Jimmy M. Hsu, Austin, TX (US); Troy M. Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/776,253

(22) Filed: Feb. 25, 2013

(65) Prior Publication Data

US 2013/0173613 A1 Jul. 4, 2013

Related U.S. Application Data

(63) Continuation of application No. 12/103,390, filed on Apr. 15, 2008, now Pat. No. 8,386,510.

(51) Int. Cl.
*G06F 7/00* (2006.01)
*G06F 17/30* (2006.01)

(52) U.S. Cl.
CPC .... *G06F 17/30525* (2013.01); *G06F 17/30516* (2013.01)

(58) Field of Classification Search
CPC ............... G06F 17/30286; G06F 17/30525; G06F 17/30516; G06F 17/301
See application file for complete search history.

(56) References Cited

U.S. PATENT DOCUMENTS

| | | |
|---|---|---|
| 2002/0184373 A1 | 12/2002 | Maes |
| 2007/0005206 A1 | 1/2007 | Zhang et al. |
| 2007/0156809 A1* | 7/2007 | Dickinson et al. ............ 709/203 |
| 2007/0192674 A1* | 8/2007 | Bodin et al. ................ 715/501.1 |
| 2007/0209011 A1* | 9/2007 | Padmanabhuni et al. ...... 715/762 |
| 2008/0034058 A1* | 2/2008 | Korman et al. ............... 709/217 |
| 2008/0141180 A1 | 6/2008 | Reed et al. |
| 2009/0259628 A1 | 10/2009 | Farrell et al. |
| 2009/0259631 A1 | 10/2009 | Farrell et al. |
| 2009/0287758 A1* | 11/2009 | Hamilton et al. ............ 709/201 |

OTHER PUBLICATIONS

U.S. Appl. No. 12/103,119 Final Office Action, Mar. 16, 2012, 15 pages.
U.S. Appl. No. 12/103,119 Final Office Action, Sep. 8, 2011, 7 pages.
(Continued)

*Primary Examiner* — Azam Cheema
(74) *Attorney, Agent, or Firm* — DeLizio Law, PLLC (57) ABSTRACT

A data feed engine allows a user to create a data feed without protocol and/or formatting knowledge for the data source. The data feed engine dynamically selects a connector for any one of a variety of different types of data sources. The date feed engine can then build a search command with search parameters and a data source identity based on the automatically selected data source connector. The data feed engine publishes a reference to the generated data feed definition in a catalog of data feeds. A framework that utilizes such functionality allows creation of a mashup to with a combination of data feeds from different types of data sources.

18 Claims, 6 Drawing Sheets

(56) References Cited

OTHER PUBLICATIONS

U.S. Appl. No. 12/103,119 Office Action, Mar. 3, 2011, 12 pages.
U.S. Appl. No. 12/103,119 Office Action, Aug. 16, 2010, 12 pages.
U.S. Appl. No. 12/103,390 Final Office Action, Sep. 1, 2011, 17 pages.
U.S. Appl. No. 12/103,390 Office Action, Mar. 15, 2011, 20 pages.
U.S. Appl. No. 12/468,166 Final Office Action, Aug. 6, 2012, 18 pages.
Hohpe, Gregor, "Google Mashup Editor and Yahoo! Pipes: Friends, not Foes", Google Mashup Editor http://code.google.com/gme/articles/gmepipes.html Jul. 2007.
Hohpe, Gregor, "Mashing It Up With Google Mashup Editor", Google Mashup Editor http://code.google.com/gme/articles/mashingitup.html Jun. 2007.
Microsoft, , "Microsoft Popfly", http://www.popfly.com/Overview/.
Yahoo!, , "Pipes", http://pipes.yahoo.com/pipes/docs?doc=overview 2008.

* cited by examiner

FLEXIBLE CONNECTOR FRAMEWORK FOR DATA FEED GENERATION

RELATED APPLICATIONS

This application claims the priority benefit of United States of America application Ser. No. 12/103,390 filed Apr. 15, 2008.

BACKGROUND

Embodiments of the inventive subject matter generally relate to the field of data processing, and, more particularly, to extending data feed generation to various types of data sources.

As Web 2.0 sites have become more prevalent, there has been an increased opportunity for end users to create and collaborate. Users sometimes combine data from different data sources to create a web service or hybrid web application ("mashups"). Tools available to create mashups include Yahoo!® Pipes, Google® Mashup Editor, and Microsoft® Popfly.

SUMMARY

Embodiments include a method that dynamically selects a data source connector from a plurality of data source connectors. The data source connector is selected based, at least in part, on an indication of data source type. A search command is generated using an indication of a data source. A data feed definition is generated with the search command and the dynamically selected data source connector. The data feed definition produces a data feed. A reference to the data feed is published in a catalog of data feeds.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to input from users, input (e.g., indication of a data source, search parameters, etc.) can be received from automated data mining operations, crawling applications, etc. In other instances, well-known instruction instances, protocols, structures and techniques have not been shown in detail in order not to obfuscate the description.

Despite the availability of mashup editors, people without programming knowledge cannot easily access the data sources to create data feeds. A data feed engine allows a user to create a data feed without protocol and/or formatting knowledge for the data source. The data feed engine automatically builds a search command with search parameters and a data source identity (e.g., server name, network address, port number, etc.). The data feed engine also encodes the built search command as a data feed and publishes a link for the data feed in a data feed catalog. After publication, users can access the catalog to combine data feeds, edit data feeds, etc., and create mashups.

Figure 1:
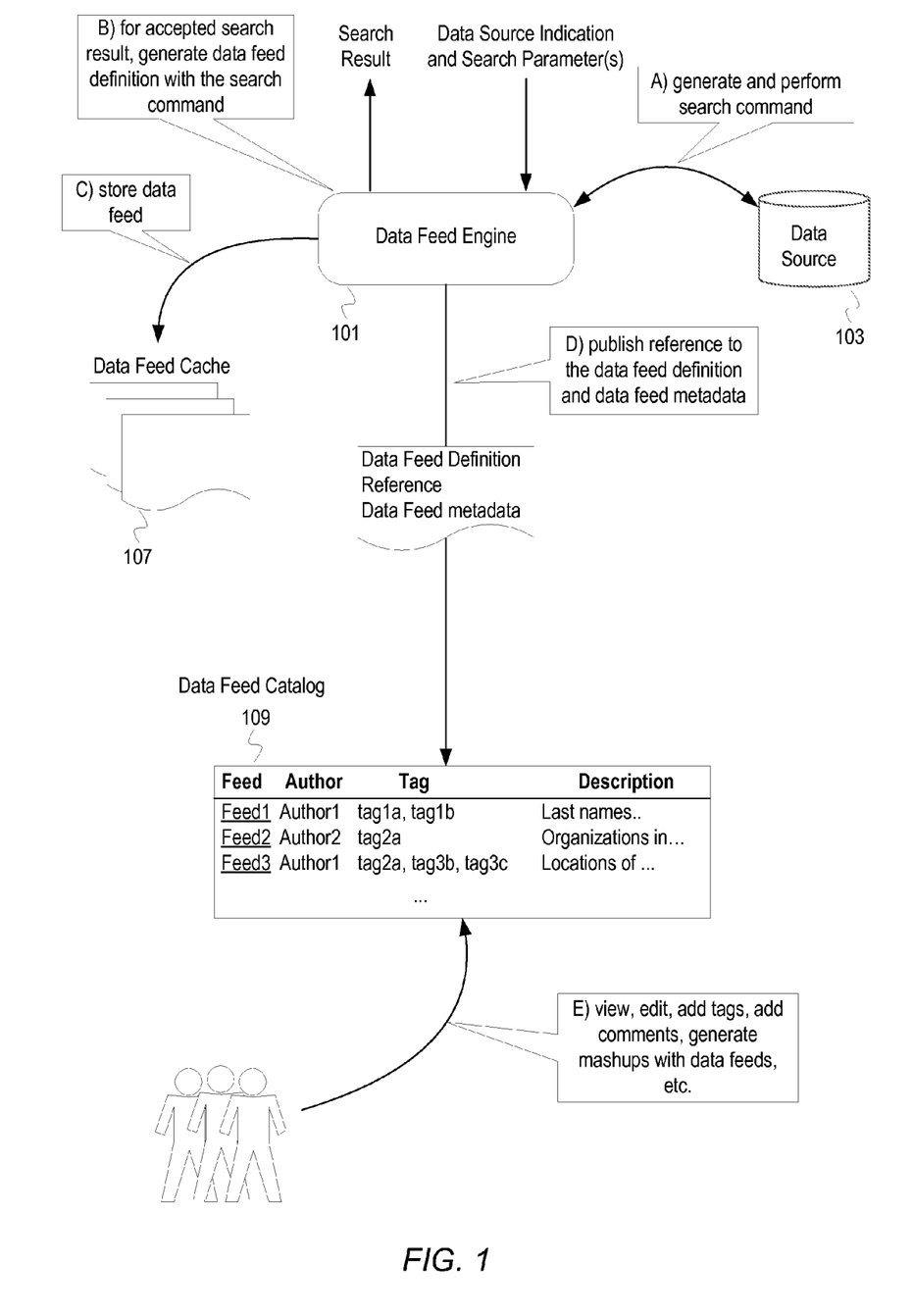
FIG. 1 depicts a conceptual example of generating a data feed with a dynamically generated search command.

FIG. 1 depicts a conceptual example of generating a data feed with a dynamically generated search command. A data feed engine 101 receives an indication of a data source (e.g., server name, network address, port number, etc.) and a search parameter(s). The data feed engine 101 generates a search command that targets the indicated data source at a stage A. For example, the data feed engine 101 builds a search command in accordance with the lightweight directory access protocol (LDAP) that targets an LDAP directory. The data feed engine 101 also performs the built search command, which targets a data source 103. The data feed engine 101 presents the search results from the data source 103. If the search result is not acceptable (e.g., a user wants to further refine the search), then the user modifies the search parameter(s), enters an additional search parameter(s), and the data feed engine 101 builds a new search command.

If the search result is acceptable, then a user indicates acceptance of the search result. For the accepted search result, the data feed engine 101 generates a data feed definition with the search command at a stage B. At a stage C, the data feed engine 101 stores the data feed definition and stores a resultant data feed of the date feed definition in a data feed cache 107 (e.g., a memory or storage that hosts a database of data feeds).

At a stage D, the data feed engine publishes a reference to the data feed definition in a data feed catalog 109. For instance, the data feed engine 101 communicates a URI for the data feed definition to a system and/or process that maintains the data feed catalog 109. The data feed engine 101 can also collect metadata for the generated data feed. Examples of data feed metadata include author(s), data of creation, a description, tag(s), permission(s), etc. The data feed engine may collect the metadata from a user and/or from analyzing one or more of the search result, data source, the search parameter(s), etc. For example, the data feed engine 101 can determine the author from login information, and populate the description with a combination of the search parameter(s) and a description of the data source. The data feed engine 101 also publishes metadata for the data feed in the data feed catalog 109.

At a stage E, users perform various operations with the data feed published in the data feed catalog 109. Examples of operations with the data feed include viewing content, editing a data feed, adding a tag(s), adding a description, editing the description, cloning the data feed, combining data feeds, and creating a mashup application with one or more of the data feeds in the data feed catalog 109. For example, a first user can clone the published data feed, and add additional search parameters via the data feed engine 101. A second user can add one or more additional tags to the published data feed and edit the description or add a separate description for the same data feed, depending on the permission(s) for the data feed. A third user can create a mashup application with one or more of the data feeds in the data feed catalog and a private data feed accessible by the third user.

In addition to ease of access with respect to programming knowledge, this framework also allows controlled access to secure data without additional layers of security and/or defining new roles for accessing the data source. The data feed engine 101 can collect security credentials when building a search command for a protected data source. The data feed engine 101 can use the security credentials in the data feed request and can utilize access controls to ensure only end-users with proper permissions may view a secure data feed. The framework separates the users from the data source as well as the data feed, while providing access to content with the data feed catalog 109.

The stages indicated in FIG. 1 are intended only to aid in understanding embodiments, and should not be used to limit the scope of the claims. For instance, the data feed engine 101 can generate a data feed from a search command without waiting for approval of a search result. In addition, the data feed engine 101 can generate a data feed without building a search command (e.g., reading a search command in a file, receiving a search command entered by a user, etc.). As another illustration of various embodiments, the operations performed at stages C and D can be performed in a different order, in parallel, can be contingent on each other (e.g., publishing only occurs after confirmation that the data feed has been stored in persistent storage), etc.

Figure 2:
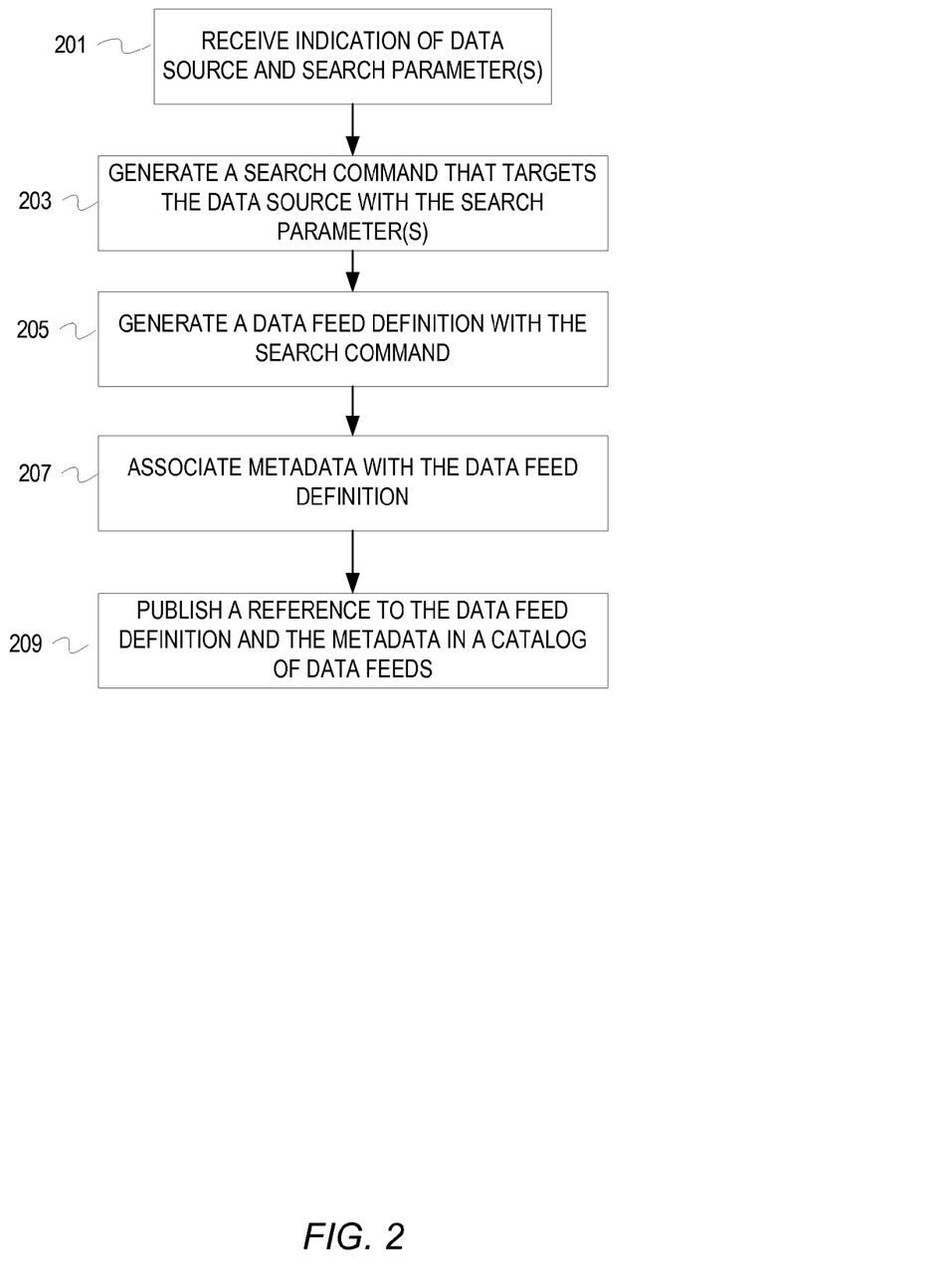
FIG. 2 depicts a flowchart of example operations for dynamic data feed generation.

FIG. 2 depicts a flowchart of example operations for dynamic data feed generation. At block 201, an indication of a data source and one or more search parameters are received. For example, an input file indicates a host for an LDAP directory and a user enters a search parameter. Various other indications can be received that impact creation of the data feed. Examples of various other indications include indication of a destination for the data feed to be stored, indication of permissions to be applied to the data feed, indication of whether to publish the data feed, test cases for validating the data feed, etc. At block 203, a search command that targets the data source is generated with the received search parameter(s). At block 205, a data feed definition is generated with the search command.

At block 207, metadata is associated with the data feed definition. For example, a title and description for the data feed definition is saved into the database. Ratings and comments can also be added by the data feed author and/or other users. The metadata is used to build up a detailed and searchable listing of the data feeds in the data feed catalog. In another example, metadata for the data feed definition is stored in a separate location from the data feed definition itself. The metadata can also be stored temporarily until published in the data feed catalog.

At block 209, a reference to the data feed definition and/or data feed is published in a data feed catalog along with metadata for the data feed definition.

This framework for easy access to both secure and non-password protected data sources is not limited to a single type of data source. The framework can be an extensible framework that allows for ease of access to secure and non-secure data source of various types. The extensible framework allows a mashup application to be created with a combination of data feeds from different data sources. For example, data feeds from an LDAP directory, a Sybase® database, a DB2® database, etc.

Figure 3:
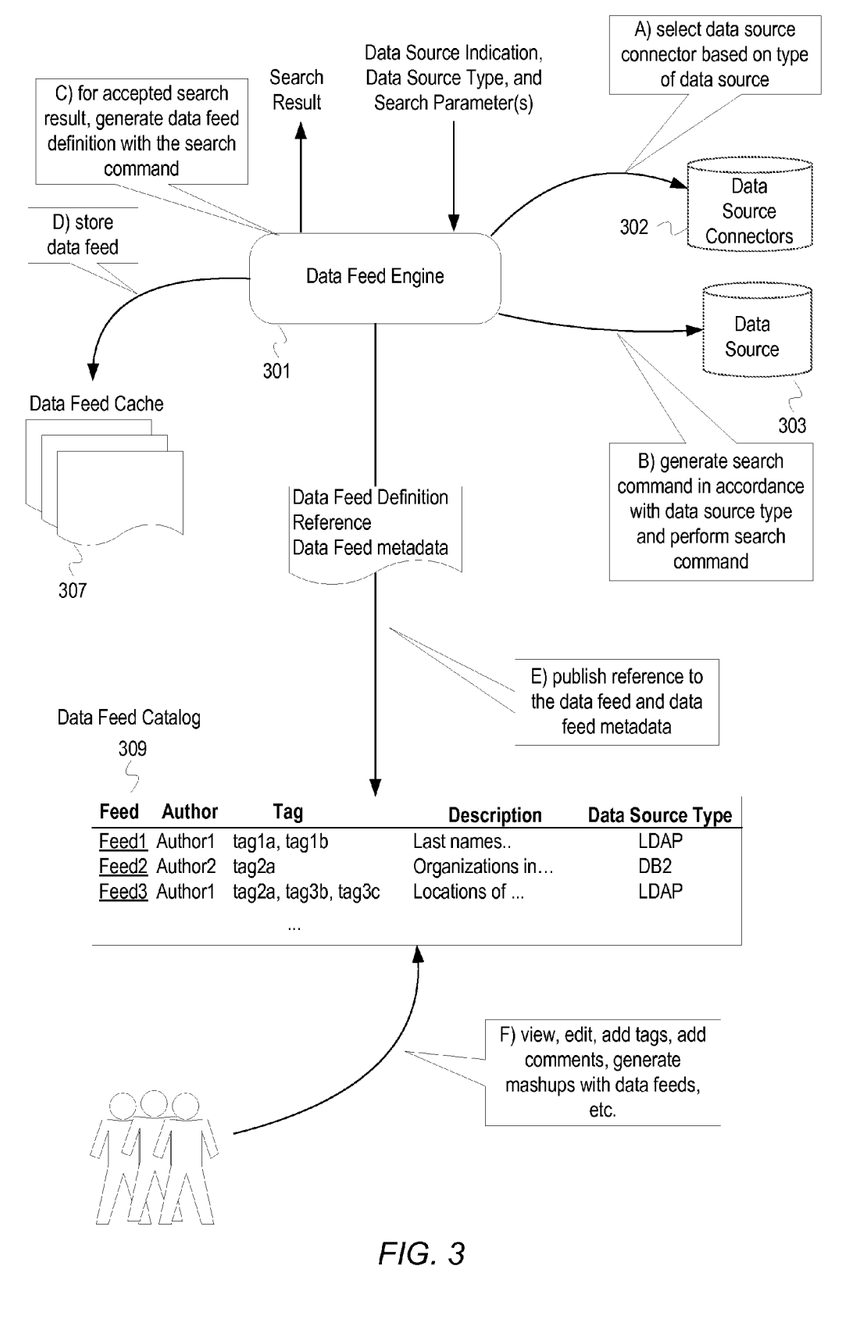
FIG. 3 depicts a conceptual example of an extensible framework for generating data feeds from various data sources.

FIG. 3 depicts a conceptual example of an extensible framework for generating data feeds from various data sources. A data feed engine 301 receives an indication of a data source (e.g., server name, network address, port number, etc.), an indication of a data source type (e.g., indication of LDAP, DB2, etc.) and a search parameter(s). The data source type indication can indicate a particular proprietary data source type or something more general (e.g., indicating a DB2 data source or a SQL based data source). At a stage A, the data feed engine 301 selects a data source connector from a store of data source connectors 302 (e.g., store of multiple markup language files for the data source connectors, a database of data source connectors, etc.) based on the indication of the data source type. At a stage B, the data feed engine 301 generates a search command in accordance with the data source type that targets the indicated data source. The data feed engine 301 also performs the built search command at stage B. The data feed engine 301 presents the search result from the data source 303. If the search result is not acceptable (e.g., a user wants to further refine the search), then the user modifies the search parameter(s), enters an additional search parameter(s), and the data feed engine 301 builds a new search command.

If the search result is acceptable, then a user indicates acceptance of the search result. For the accepted search result, the data feed engine 301 generates a data feed definition with the search command at a stage C. At a stage D, the data feed engine 301 stores the data feed definition and stores a resultant data feed of the data feed definition in data feed cache 307.

At a stage E, the data feed engine publishes a reference to the data feed definition in a data feed catalog 309. For instance, the data feed engine 301 communicates a URI for the data feed to a system and/or process that maintains the data feed catalog 309. The data feed engine 301 can also collect metadata for the generated data feed. Examples of data feed metadata include author(s), data of creation, a description, tag(s), permission(s), etc. The data feed engine may collect the metadata from a user and/or from analyzing one or more of the search result, data source, the search parameter(s), etc. For example, the data feed engine 301 can determine the author from login information, and populate the description with a combination of the search parameter(s) and a description of the data source. The data feed engine 301 also publishes metadata for the data feed and an indication of the data source type in the data feed catalog 309.

At a stage F, users perform various operations with the data feed published in the data feed catalog 309, similar to the examples provided with reference to FIG. 1. Examples of operations with the data feed include viewing content, editing a data feed, adding a tag(s), adding a description, editing the description, cloning the data feed, combining data feeds, and creating a mashup application with one or more of the data feeds in the data feed catalog 309. For example, a first user can clone the published data feeds from different types of data sources with substantially similar content and compare the content from the data feeds. A second user can use a data feed from a first type of data source to populate a data source of a second type, perhaps more adaptable for a mashup application being created by the second user.

Figure 4:
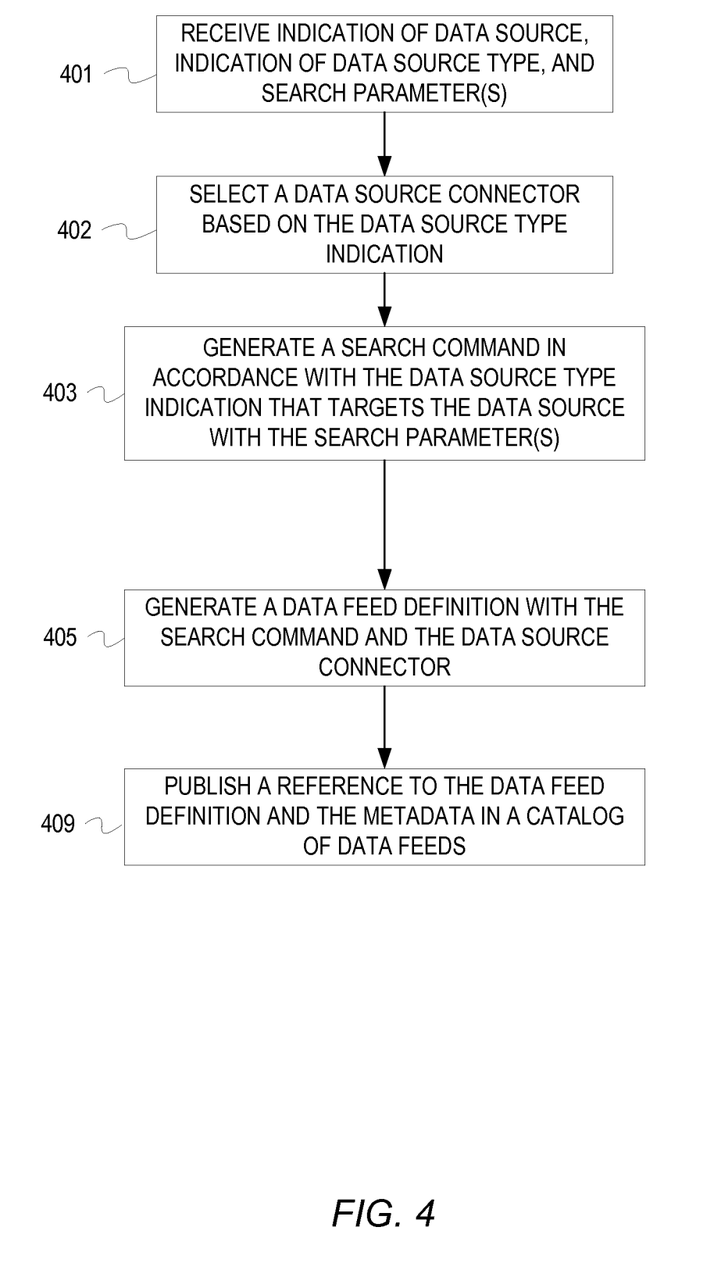
FIG. 4 depicts a flowchart of example operations for dynamically generating data feeds to various data sources.

FIG. 4 depicts a flowchart of example operations for dynamically generating data feeds to various data sources. At block 401, an indication of a data source, and indication of a type of the data source, and a search parameter(s) is received. At block 402, a data source connector is selected based on the data source type indication. At block 403, a search command in accordance with the data source type indication is generated that targets the data source with the search parameter(s). For example, an SQL query is generated for a DB2 database. At block 405, a data feed definition is generated with the search command and the data source connector. At block 409, a reference to the data feed definition and/or data feed along with metadata for the data feed definition are published in a catalog of data feeds.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 4, a data source connector may not be selected. For example, the indicated data source type may be LDAP directory and no connector selected for an LDAP directory. As another example, additional operations can be performed to associate metadata with the generated data feed definition. In addition, some embodiments may perform additional operations to embed and secure security credentials in a data feed definition. Embodiments can also perform additional operations to automatically generate derivative data feeds using the initial search command and/or data feed definition.

Figure 5:
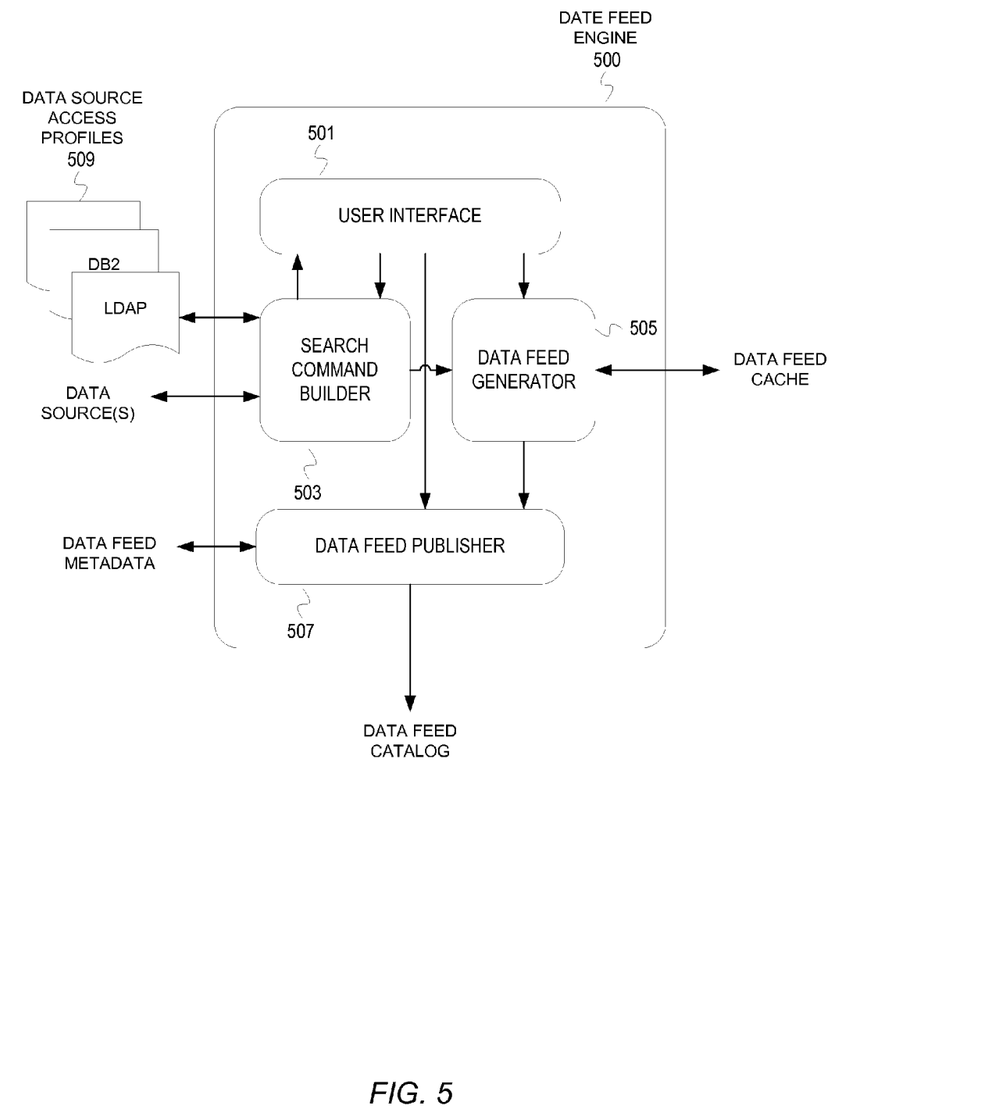
FIG. 5 depicts a conceptual example of a data feed engine.

FIG. 5 depicts a conceptual example of a data feed engine. A data feed engine 500 comprises a user interface 501, a search command builder 503, a data feed generator 505, and a data feed publisher 507. The user interface 501 presents a user with various fields, both empty and pre-filled, for a user to indicate a data source, one or more search parameters, etc. The user interface 501 can populate a pre-filled field (e.g., drop down menu) with semantics, coding, etc., for a particular type of data source based on information from the search command builder 503. The user interface 501 can also present a user with common language terms that map to specific token, semantics, flags, etc. of a type of data source.

The search command builder 503 can map these common language terms to the specific elements pulled from data source profiles 509. The data source profiles 509 indicate various elements specific to different types of data sources (e.g., LDAP search operation parameters, LDAP search operation filters, LDAP search string, SQL statements, SQL predicates, etc.). Although the data source access profiles 509 can be implemented as part of the data feed engine 500, FIG. 5 depicts the data source access profiles 509 as being stored separately. Embodiments can also embody a default set of data source access profiles with a data feed engine, and configure the data feed engine to access store or memory for additional data source access profiles. The search command builder 503 selects an appropriate one or more of the data source access profiles 509 to build a search command based on the input received with the user interface 501, and any additional data (e.g., previously configured data, automatically determined data, etc.). The search command builder 503 can then perform the search command and present the result of the search command to the user interface 501. The search command builder 503 presents the search command to the data feed generator 505.

The data feed generator 505 generates a data feed with the search command from the search command builder. The data feed generator 505 may also receive data from the user interface 501 for generating a data feed. For instance, the data feed generator 505 can receive security credentials or a desired number of search results. The data feed generator 505 can then write an XML file with an open session or connection sequence that utilizes the security credentials. The data feed generator 505 also writes the search command into the data feed. The data feed generator 505 may modify and/or reformat the search command to suit the data feed (e.g., the search command is reformatted for an RSS feed or in accordance with the Atom syndication format). The data feed generator 505 then stores the data feed in the data feed cache subsystem, which manages the storage, retrieval, and refresh intervals of cached data feeds (e.g., as a file or as an entry in a database). Embodiments can also dynamically generate variations of the data feed. For example, the search command builder can generate a second feed with a search command that sorts the search results. This derivative search command can be generated autonomously by the search command builder 503, based on input from the user interface 501, in response to a request from the data feed generator 505, etc. The data feed generator 505 communicates a reference to the data feed to the data feed publisher 507.

The data feed publisher 507 publishes the reference to the data feed in a data feed catalog. The data feed publisher 507 can perform any one of writing the reference to the data feed into a data feed catalog, communicating the reference to a process and/or system that maintains the data feed catalog, and create a new data feed catalog to publish the data feed reference. The data feed publisher 507 may also receive additional data (e.g. metadata, permission(s), etc.) for the data feed from the user interface 501 and/or dynamically generate metadata based on analyzing the data feed and/or search results. The data feed publisher 507 also publishes the additional data in the data feed catalog.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing (machine readable storage medium) or transmitting (machine readable signal medium) information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
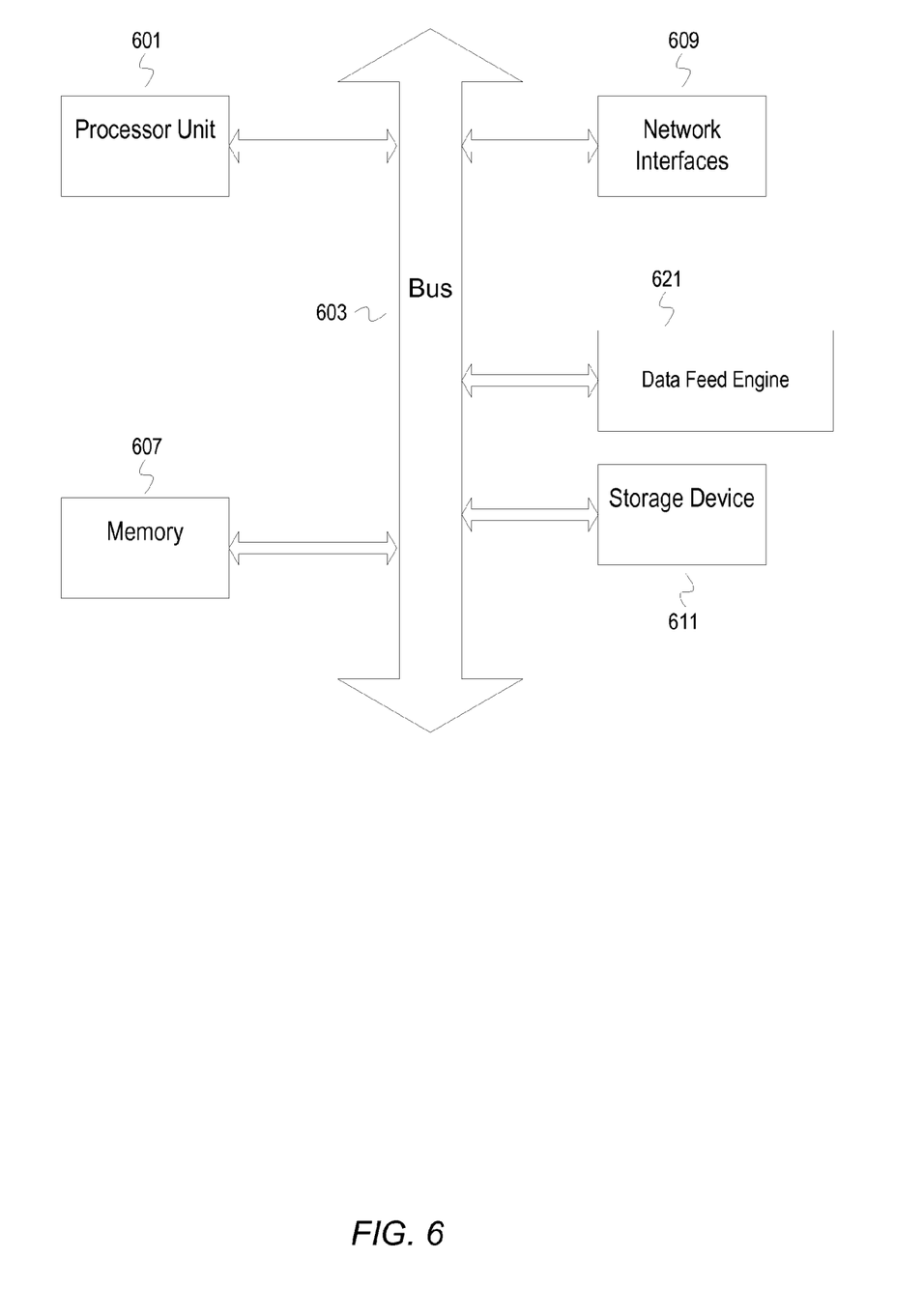
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 609 (e.g., an ATM interface, an Ethernet interface, a Frame Relay interface, SONET interface, wireless interface, etc.), and a storage device(s) 611 (e.g., optical storage, magnetic storage, etc.). The example computer system also comprises a data feed engine 621 that performs at least some of the functionality described above for generating data feeds. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, a field programmable gate array, etc. Further, realizations may include fewer or additional components not illustrated in FIG. 6 (e.g., video cards, audio cards, additional network interfaces, peripheral devices, etc.). The processor unit 601, the storage device(s) 611, the data feed engine 621, and the network interface 609 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for executable content filtering as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method comprising:
    dynamically selecting a data source connector from a plurality of data source connectors based, at least in part, on an indication of a data source type, wherein the plurality of data source connectors comprises at least one of a database of data source connectors and a plurality of markup language files that indicate the plurality of data source connectors;
    generating a search command using an indication of a data source;
    issuing the search command to the data source;
    in response to the search command, receiving search results;
    presenting, by one or more processors, an interface for receiving approval of the search results; and
    upon receiving approval of the search results, performing operations including:
        generating a data feed definition with the search command and the dynamically selected data source connector, wherein the data feed definition produces a data feed, and
        publishing a reference to the data feed in a catalog of data feeds.

2. The method of claim 1, wherein said generating the data feed definition with the search command comprises creating a markup language file with the search command or storing the data feed definition in a database.

3. The method of claim 2 further comprising embedding security credentials for accessing the data source in the markup language file.

4. The method of claim 2 further comprising storing security credentials for the data source in the database.

5. The method of claim 1 further comprising building the plurality of data source connectors for extensibility of the catalog of data feeds to different types of data sources.

6. The method of claim 1 further comprising receiving the indication of the data source type and the indication of the data source.

7. The method of claim 1 further comprising associating metadata with the data feed definition, wherein said publishing the reference to the data feed in the catalog of data feeds comprises publishing the metadata with the data feed in the catalog of data feeds.

8. The method of claim 1, wherein said generating the search command using the indication of a data source comprises generating the search command with one or more search parameters.

9. A computer implemented method comprising:
    receiving an indication of a data source;
    presenting, by one or more processors, a user interface having common language terms mapped to tokens, semantics or flags specific to a data source type corresponding to the data source;
    dynamically selecting a data source connector from a plurality of data source connectors based, at least in part, on an indication of the data source type, wherein the plurality of data source connectors comprises at least one of a database of data source connectors and a plurality of markup language files that indicate the plurality of data source connectors;
    generating a search command using the indication of the data source, the indication of the data source type, and one or more search parameters received from the user interface;
    issuing the search command to the data source;
    in response to the search command, receiving search results;
    presenting an interface for receiving approval of the search results; and
    upon receiving approval of the search results, performing operations including:
        generating a data feed definition with the search command and the dynamically selected data source connector, wherein the data feed definition produces a data feed, and publishing a reference to the data feed in a catalog of data feeds, wherein the catalog of data feeds comprises references to data feeds sourced from different types of data sources.

10. The method of claim 9 further comprising associating metadata about the data feed definition with the data feed, wherein said publishing the reference to the data feed in the catalog of data feeds comprises also publishing the metadata.

11. A machine-readable memory device having stored therein a program product, which when executed on a set of one or more processor units causes the set of one or more processor units to perform operations that comprise:

dynamically selecting a data source connector from a plurality of data source connectors based, at least in part, on an indication of data source type, wherein the plurality of data source connectors comprises at least one of a database of data source connectors and a plurality of markup language files that indicate the plurality of data source connectors;

generating a search command using an indication of a data source;

issuing the search command to the data source;

in response to the search command, receiving search results;

presenting an interface for receiving approval of the search results; and upon receiving approval of the search results, performing operations including:

generating a data feed definition with the search command and the dynamically selected data source connector, wherein the data feed definition produces a data feed, and publishing a reference to the data feed in a catalog of data feeds.

12. The machine-readable memory device of claim 11, wherein said operation of generating the data feed definition with the search command comprises creating a markup language file with the search command or storing the data feed definition in a database.

13. The machine-readable memory device of claim 12, wherein the operations further comprise embedding security credentials for accessing the data source in the markup language file.

14. The machine-readable memory device of claim 12, wherein the operations further comprise storing security credentials for the data source in the database.

15. The machine-readable memory device of claim 11, wherein said operations further comprise building the plurality of data source connectors for extensibility of the catalog of data feeds to different types of data sources.

16. An apparatus comprising:
a set of one or more processors;
a memory device communicably coupled to the set of one or more processors;
a network interface; and
a data feed engine coupled with the set of one or more processors and the network interface, the data feed engine comprising,
a user interface configured to present user interface elements having common language terms mapped to tokens, semantics or flags specific to a data source type corresponding to a data source,
a search command builder configured to dynamically select a first data source connector from a plurality of data source connectors based, at least in part, on an indication of the data source type and configured to build a search command that targets the data source using an indication of the data source and the first data source connector, wherein the plurality of data source connectors comprises at least one of a database of data source connectors and a plurality of markup language files that indicate the plurality of data source connectors,
a data feed generator coupled with the search command builder, the data feed generator configured to generate a data feed definition with the search command from the search command builder and configured to communicate a reference to the data feed definition, wherein the data feed definition produces a data feed, and
a data feed publisher coupled with the data feed generator, the data feed publisher configured to publish the reference to the data feed definition from the data feed generator.

17. The apparatus of claim 16, wherein the user interface is configured to present fields for receiving input that comprises one or more search parameters, the indication of the type of data source, and the indication of the data source.

18. The apparatus of claim 16, wherein the search command builder is further configured to add an additional data source connector to the plurality of data source connectors.

* * * * *